UNITED STATES PATENT OFFICE.

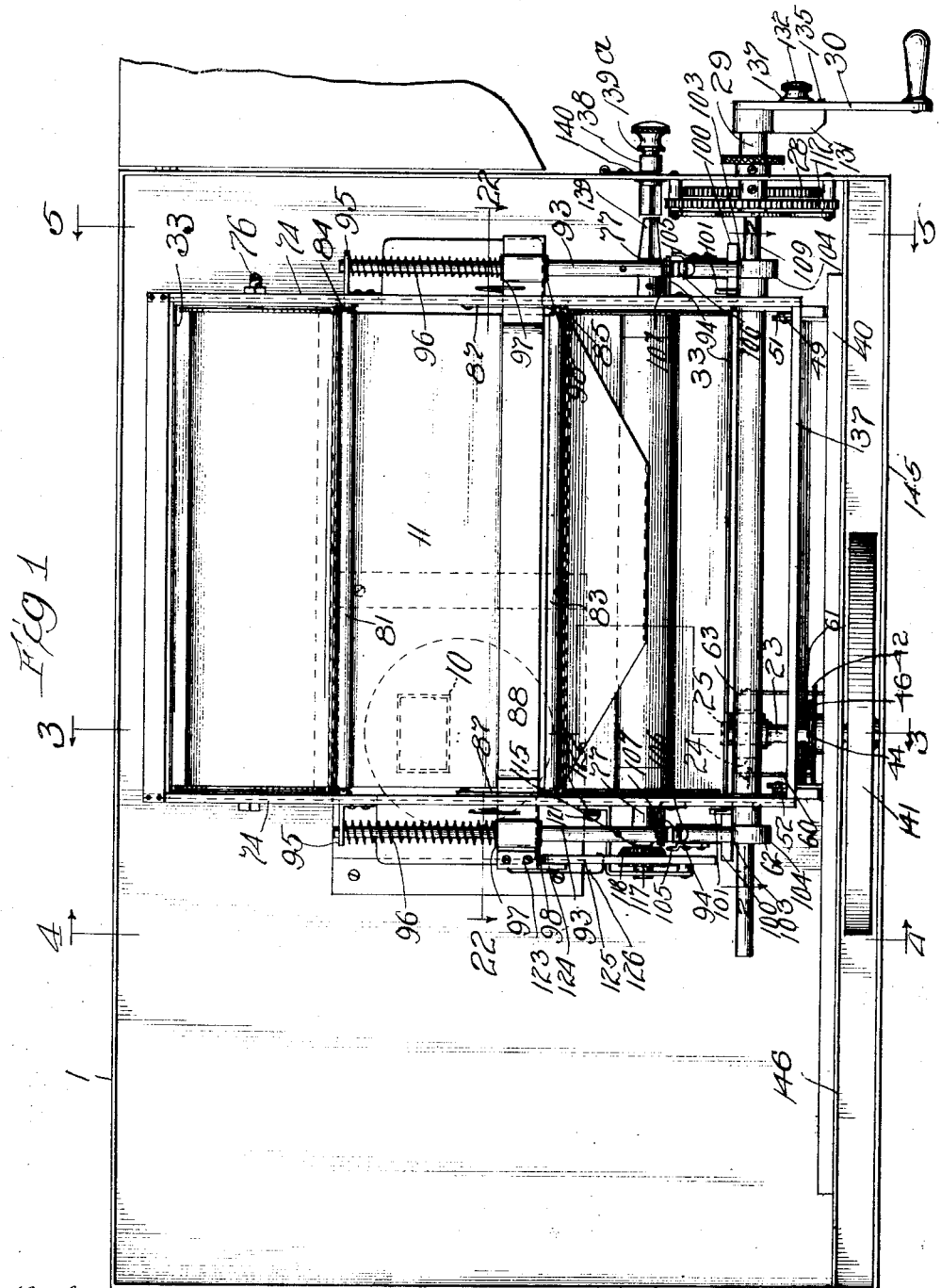

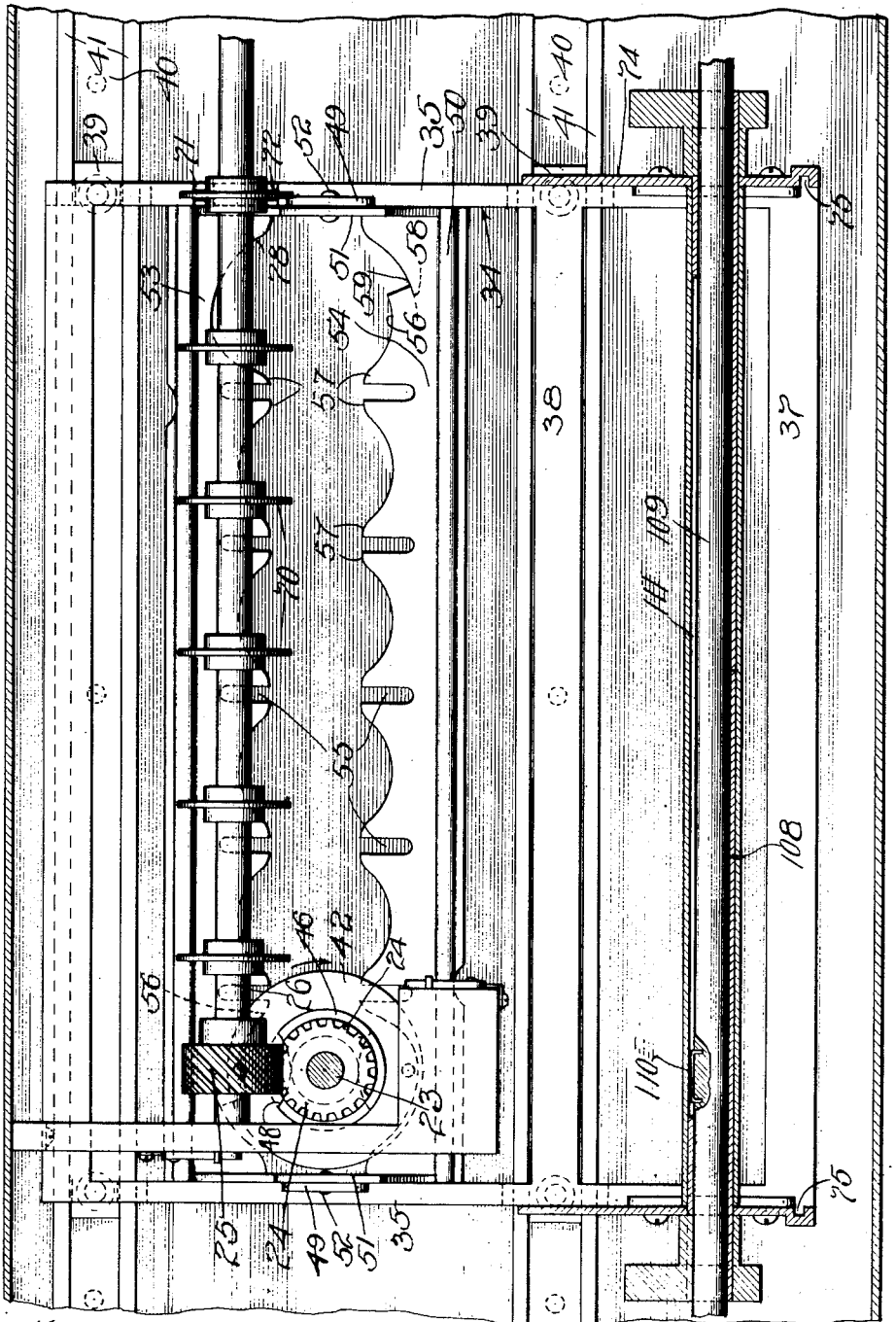

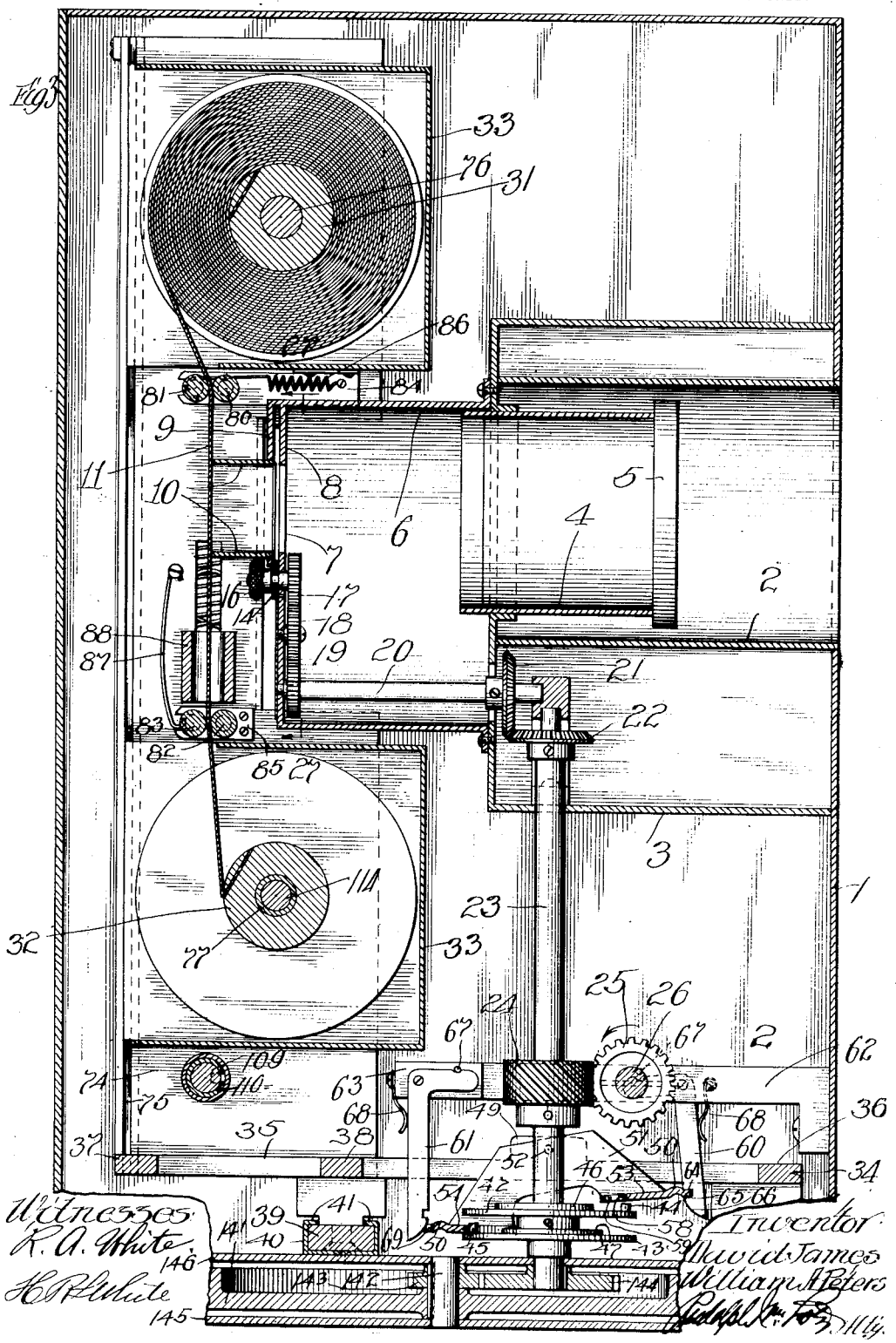

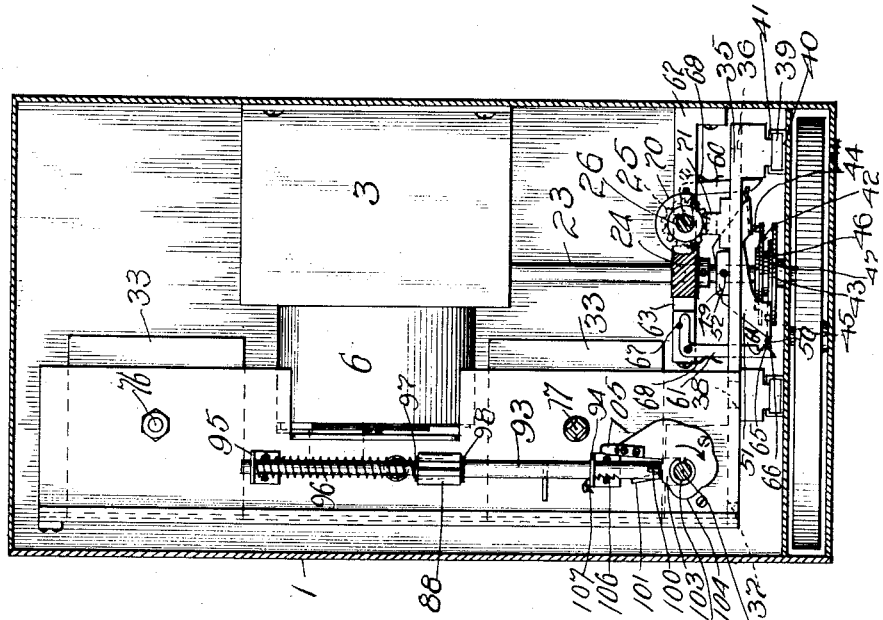

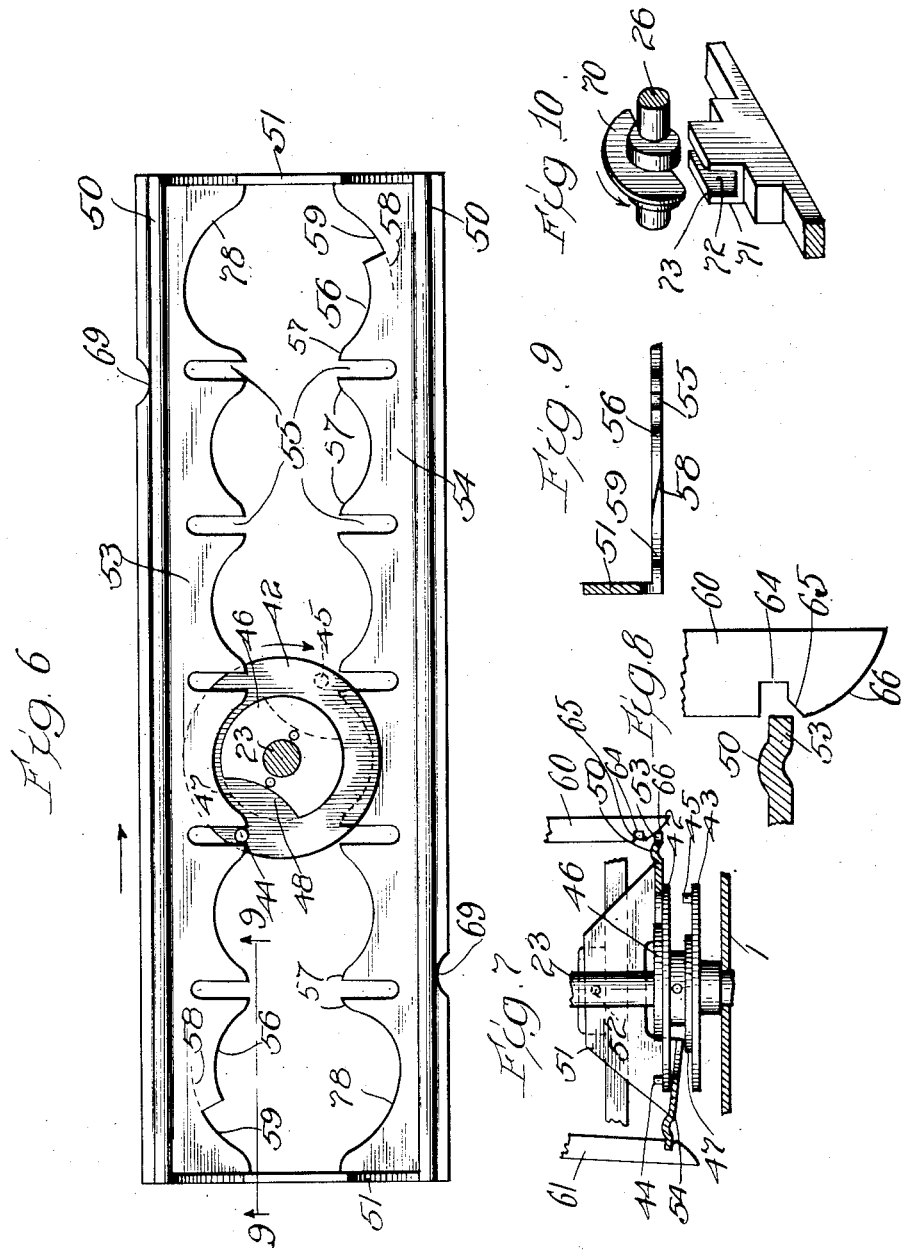

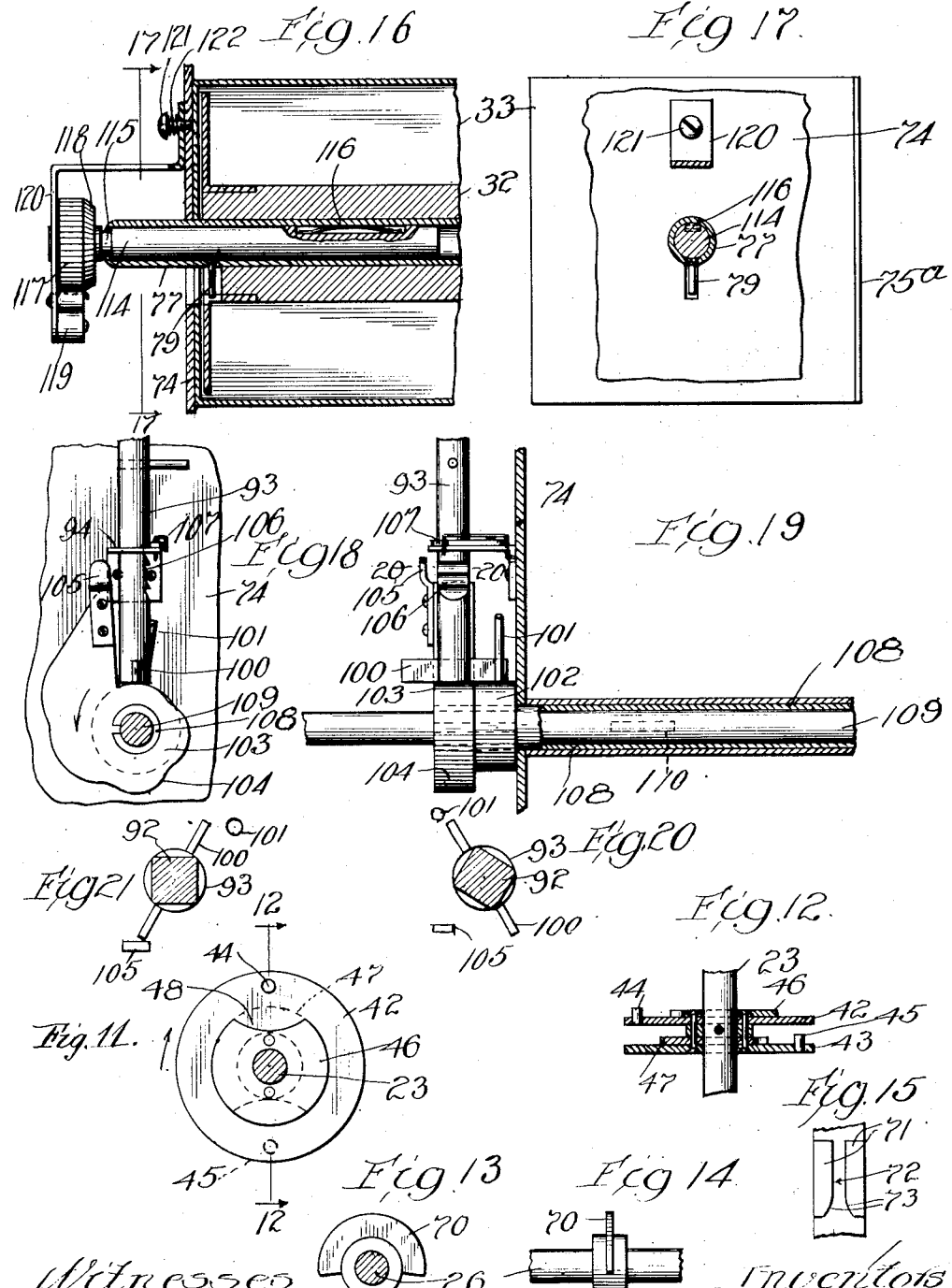

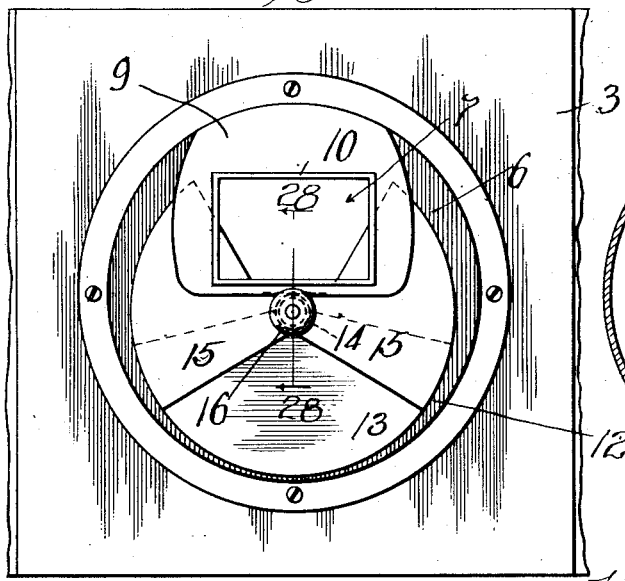
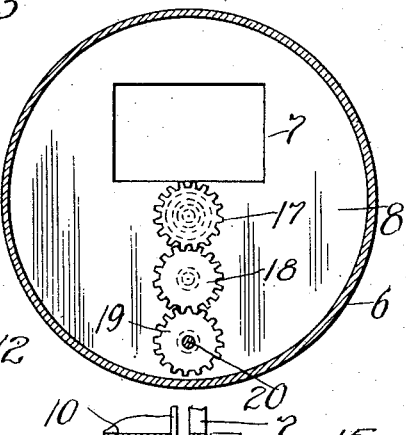
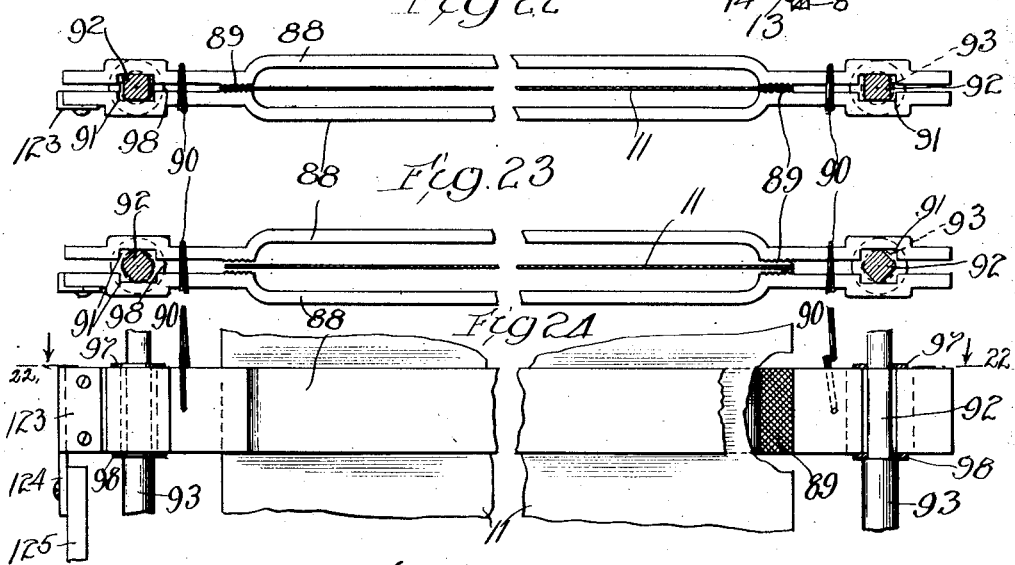
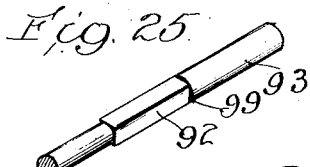

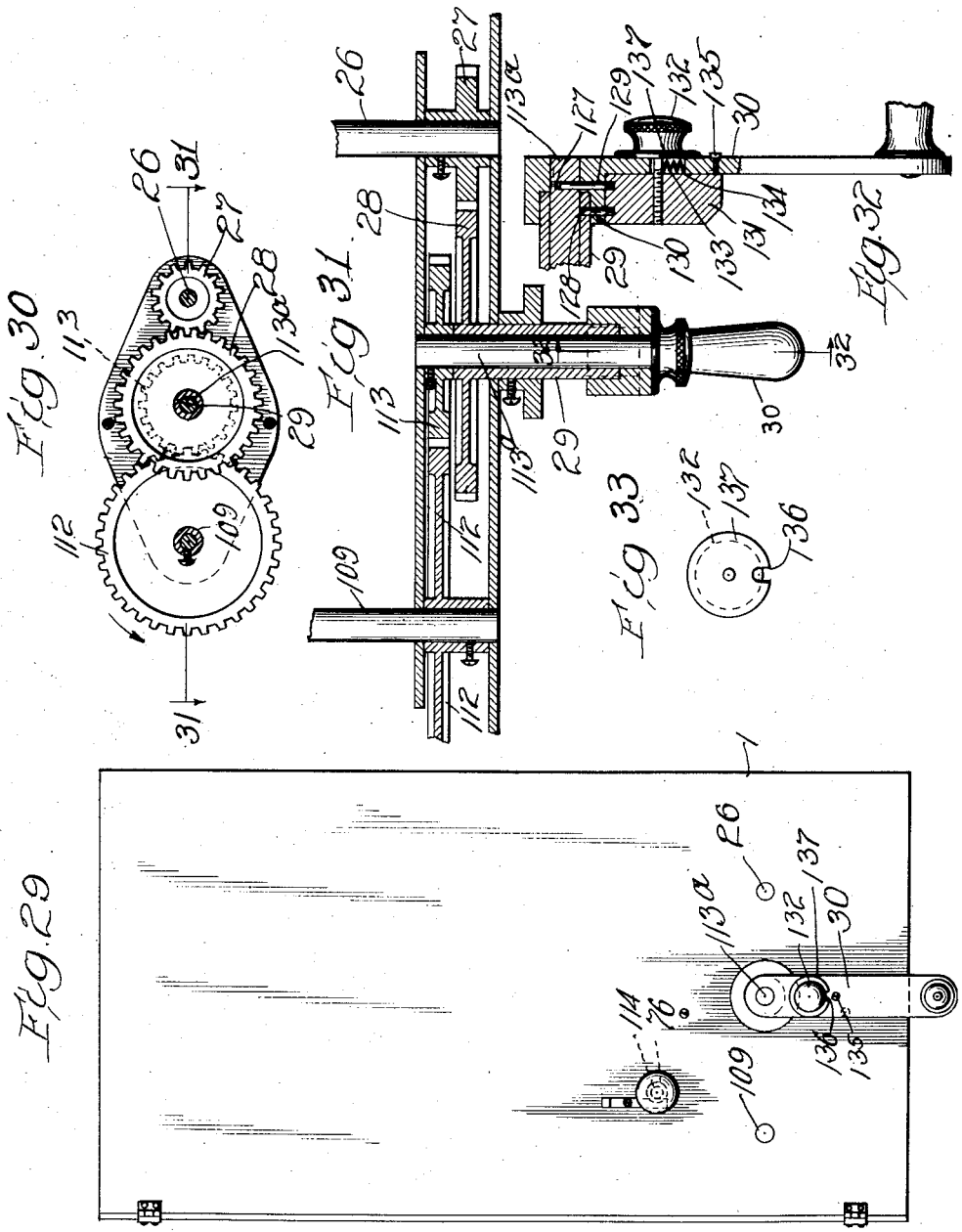

DAVID JAMES, OF OAK PARK, AND WILLIAM A. PETERS, OF CHICAGO, ILLINOIS, ASSIGNORS TO ESSANAY FILM MANUFACTURING COMPANY, OF CHICAGO, ILLINOIS, A CORPORATION OF ILLINOIS.

PHOTOGRAPHIC CAMERA.

1,141,091.      Specification of Letters Patent.      Patented May 25, 1915.

Application filed December 3, 1909. Serial No. 531,278.

*To all whom it may concern:*

Be it known that we, DAVID JAMES, residing at Oak Park, and WILLIAM A. PETERS, residing at Chicago, both in the county of Cook and State of Illinois, citizens of the United States, have invented certain new and useful Improvements in Photographic Cameras; and we do hereby declare the following to be a full, clear, and exact description of the invention, such as will enable others skilled in the art to which it appertains to make and use the same.

This invention has for its object to produce a portable moving picture camera particularly adapted for amature use in which films of the type ordinarily employed in kodaks are used and consists in the features of construction and combinations of parts hereinafter fully described and claimed.

In the accompanying drawings illustrating a suitable embodiment of the invention: Figure —1— is a rear elevation of a camera constructed in accordance with the invention, the rear wall or cover being removed to disclose the mechanism. Fig. —2— is a plan section of the same on the line 2—2 of Fig. —1—. Fig. —3— is a vertical longitudinal section of the same taken on the line 3—3. Figs. —4— and —5— are vertical longitudinal sections on the lines 4—4 and 5—5 respectively of Fig. —1—. Fig. —6— is a detail plan view partly in section showing the mechanism employed for imparting lateral movement to the film carriage. Fig. —7— is a fragmentary detail vertical sectional view showing the same mechanism for laterally moving the carriage in a position reversed relatively to that shown in Fig. —3—. Fig. —8— is a fragmentary detail view partly in section and partly in elevation showing a retaining device employed. Fig. —9— is a fragmentary detail vertical section on the line 9—9 of Fig. —6—. Fig. —10— is a fragmentary detail perspective view showing the means for holding the carriage against movement during the intervals of exposure. Fig. —11— is a detail plan view partly in section of the rotating part of the carriage actuating mechanism. Fig. —12— is a detail vertical section on the line 12—12 of Fig. —11—. Figs. —13— and —14— are detail views in section and elevation respectively of the devices on the drive shaft forming part of the carriage detention mechanism shown in Fig. —10—. Fig. —15— is a detail plan view of a bifurcated projection on the carriage receiving the detaining devices on the drive shaft shown in Figs. —13— and —14—. Fig. —16— is a fragmentary detail vertical section on the line 16—16 of Fig. —4—. Fig. —17— is a detail vertical section on the line 17—17 of Fig. —16—. Fig. —18— is a fragmentary detail side elevation of a part of the film shifting mechanism. Fig. —19— is a detail view partly in elevation and partly in section showing the mechanism illustrated in Fig. —18—. Figs. —20— and —21— are detail diagrammatic plan sections on the line 20—20 of Fig. —19— showing a part of the film shifting mechanism in different positions. Figs. —22— and —23— are detail plan sections on the line 22—22 of Figs. —1— and —24— showing the film gripping devices in different positions. Fig. —24— is a fragmentary detail view in elevation of said grippers, one of the same being partly broken away. Fig. —25— is a detail perspective view of one of the vertical shafts opening the grippers. Fig. —26— is a detail view in elevation showing the shutter employed. Fig. —27— is a detail sectional view on the line 27—27 of Fig. —3— showing the gear train transmitting movement to the shutter. Fig. —28— is a fragmentary detail section on the line 28—28 of Fig. —26— showing the hand operated means for adjusting the shutter. Fig. —29— is a view in elevation of the right hand side of the machine. Fig. —30— is a detail view in elevation of gears employed. Fig. —31— is a detail plan section on the line 31—31 of Fig. —30— showing the crank employed for operating the machine. Fig. —32— is a detail section on the line 32—32 of Fig. —31—. Fig. —33— is a detail view in elevation of a disk employed on the crank.

The primary object of our invention is to provide a moving picture camera which is relatively small and light and in which the rolls of films ordinarily employed in kodaks and similar amateur instruments are utilized.

To attain our object we employ suitable mechanism for imparting lateral and longitudinal movement to the film at regular intervals so as to bring a fresh area into focal relation to the lens after each movement in either direction and expose such area while the film is at rest.

In carrying out the invention we have aimed at simplicity and durability as well as efficiency of all mechanism employed so as to reduce to a minimum the necessity for repairs, render the operation easy and simple so as to particularly adapt it for amateur use, and reduce to a minimum the possibilities of failure in operation either by defects or delicacy of the mechanism or the omission by the operator of performance of a requisite operation by reason of a large number of operations and the consequent complicated nature of the instructions regarding the same. In other words, the machine has been constructed with a view to the obviation of any expert knowledge on the part of the operator.

The invention consists primarily in the provision of a carriage on which the roll of film and the take-up roll are mounted providing simple and efficient means for moving the film longitudinally at predetermined intervals, and providing mechanism for reciprocating the carriage laterally at regular intervals with intermittent movement, such lateral movement of the carriage being alternated with longitudinal movement of the film and all movement of the latter being with relation to a field of exposure or focal field with the result that zig-zag rows of relatively very small negative pictures are produced on the film. The details of the mechanism employed as well as the broad conception for effecting the desired results are included in the invention and are hereinafter fully described and claimed.

We desire to direct particular attention to the fact that the construction illustrated and described represents only what we deem to be the best means for effecting the desired result and has thus far demonstrated its efficiency but that changes may be effected in the details of construction without departing from our invention as set forth in the appended claims.

In describing the invention we have made no particular mention of materials used nor any methods to be employed in the manufacture of the device, believing such matter to be superfluous and proposing to employ materials and methods best suited to the attainment of the objects of our invention.

The machine comprises a rectangular box-like casing —1— provided with suitable means of access to the interior such as latched doors or covers, description of which and their respective locations is deemed superfluous, it being sufficient to state that they are provided wherever required.

To the middle of the front wall of the casing —1— there is fitted a tube —2— which is inclosed in a rectangular casing —3—, said tube projecting at one end into a circular opening in said front wall. Suitably fitted and secured concentric with the tube —2— is a tube —4— equipped at one end with a lens, the frame of which is indicated at —5—. Secured to and extending rearwardly from the casing —3— is a tubular casing —6— disposed eccentric to the tubes —2— and —4— which is provided with an oblong opening —7— in its rear wall —8—, said opening being disposed in horizontal (i. e. focal) alinement with the lens. A plate —9— extends parallel with the wall —8— and is similarly provided with an oblong opening in alinement with the opening —7— and which is bordered by a flange —10— projecting rearwardly from the said plate —9— and terminating very near the plane of travel of the film —11—. The said oblong opening —7— (Figs. 26, 27, 28) is controlled by a rotating shutter —12— consisting of a substantially semi-circular plate —13— non-rotatably secured upon the shaft —14— journaled in a suitable bearing in the wall —8—, and two segmental plates —15— rotatable on said shaft and overlapping the plate —13— and adapted to be moved relatively to each other to increase or decrease the width of segmental recess in the shutter formed thereby thus increasing or decreasing the duration of exposure of a given film area during revolutions of the said shutter in a well-known and obvious manner. A set-screw —16— disposed on the threaded reduced end of the shaft —14— serves to clamp the said segmental plates —15— rigid with the plate —13—.

The shaft —14— carries a spur pinion —17— rigid therewith and is geared by means of a train of gears —18— and —19—, shaft —20— and miter gears —21— and —22— with a vertical shaft —23— so as to rotate at equal speed with the latter. Rigid with said shaft —23— is a forty-five degree pitch helical spur gear —24— meshing with a similar gear —25— on the horizontal shaft —26— which is geared by means of the pinion —27— and gear —28— with the hollow shaft —29— journaled in a suitable bearing in the right hand side wall of the casing and which is adapted to be connected with and rotated by the crank —30—.

The film —11— is fed from a roll —31— onto the take-up roll —32—, both said rolls being revolubly mounted in rectangular casings —33— (Fig. —3—), both of which are suitably mounted upon a carriage —34— reciprocally movable in suitable guides disposed upon the bottom wall of the casing —1—. The said carriage comprises the rectangular frame consisting of end pieces —35— and side pieces or rails —36— and —37— and an intermediate rail —38—. The said rails —36— and —38— are equipped with shoes —39— which are longitudinally movable in the guides —40— mounted on the bottom wall of the casing, the said guides being provided with overhanging flanges —41— engaging the top walls of the shoes —39—, the latter being thus held against movement in any direction except longitudinally relatively to the said guides. The said carriage —34— is moved at given intervals from one limit of its movement to the other and during the intervals of movement thereof the body portion of the shutter prevents the penetration of rays to the film. After each succeeding movement of the carriage it remains at rest for a short period during which the segmental recess in the shutter passes the opening —7— thus exposing the film. In the instance illustrated the carriage makes five successive equal movements in traveling from one limit of its movement to the other thus permitting six exposures to be made on the film during such travel. The film is maintained immovable relatively to the carriage during such travel but when the carriage reaches either limit of its movement and after the last exposure has been made laterally of the film the latter must be moved longitudinally relatively to the carriage in order to bring an unexposed lateral strip opposite the opening —7—. While this movement of the film is effected the carriage must remain at rest and the interval of rest must continue until the first exposure of the new strip of film has been effected, that is to say, the carriage after reaching either limit of its movement must remain at said limit long enough to effect two exposures, viz., the last exposure on one strip and the first exposure on the next succeeding strip. The accomplishment of this result constitutes the very essence of the invention and the means employed for the purpose will now be fully described.

On the lower end of the shaft —23— below the helical gear —24— thereon are two parallel disks —42— and —43— rigid with said shaft, (Figs. —2—, —3—, —6—, —11— and —12—). Each of said disks is provided with a pin —44— and —45— respectively adjacent its periphery, said respective pins being disposed diametrically opposite each other. Upon the upper faces of said disks —42— and —43— there are mounted disks —46— and —47— respectively concentric and rigid therewith, each of said disks being provided in the portion of its edge nearest to and in radial alinement with the pin with a recess —48—. The functions of said pins and disks will appear hereinafter.

On the end rails —35— of the carriage —34— (Fig. —2—) are two parallel ears or lugs —49— to which a cradle —50— is pivotally secured, said cradle being equipped with parallel end plates —51— through which and said ears —49— rivets —52— or the like are passed to effect pivotal connection. The side rails —53— and —54— of said cradle are disposed at lower elevations than the pivotal axis of the cradle and angularly relatively to each other. Said side rails —53— and —54— are provided in their opposing edges with opposed recesses —55— spaced equidistantly from each other, the recesses —55— of the rail —53— being adapted to receive the pin —44— on the disk —42— and the recesses —55— of the rail —54— to receive the pin —45— on the disk —43—. Between each two adjacent recesses —55— of said rails —53— and —54— the latter are provided with concave recesses —56— corresponding in radius substantially with the disks —46— and —47— and receiving the latter at intervals, the recesses —48— in said disks —46— and —47— receiving the projections —57—between adjacent recesses —55— and —56— in said rails —53— and —54—. Only one of said rails —53— and —54— is at any time disposed in actuating relation to one of said disks —42— —43—. In Figs. —6— and —7— the rail —53— is shown disposed in actuating relation to the disk —42— the pin —44— of the latter entering successively the recesses —55— in said rail —53— and by engagement with a wall thereof moving the cradle and thereby the carriage —34— a distance equal to the distance between centers of adjacent recesses —55—. The radial distance of the pin —44— from the axis of the shaft —23— is such that said pin describes an arc during its engagement with a wall of a recess —55—, the chord of which is equal in length to the distance between centers of adjacent recesses —55—. The distance radially between the pin —44— and the innermost portion of the wall of the recess —48— in the disk —46— is substantially equal to the depth of the recesses —55—, or more properly speaking, the deepest point in the recess —48— is substantially equidistant from the axis of the shaft —23— with the plane of travel of the free ends of the projections —57—, the latter being thus permitted to pass the disk —46— between the intervals of reception of the periphery of the latter into the concave recesses —56— which it snugly fits, the purpose of said disk —46— being to hold the cradle and carriage against movement between the intervals of engagement by the pin —44—. The arrows in Fig. —6— indicate the directions of rotation of the shaft —23— and direction of travel of the cradle and carriage.

In Fig. —2— the carriage and cradle are shown disposed at the right-hand limit of their movement and the pins —44— and —45— are shown in the position in which the pin —44— engages a cam surface —58— on the lower face of the rail —53— adjacent the left-hand end thereof. This is shown in detail in Fig. —9—. To permit pin —44— to engage said cam surface —58— the wall of the recess —56— at the left-hand end of said rail —53— is cut back to form a recess —59— through which said pin travels before engaging said cam surface. In passing under and engaging said cam surface said pin —44— raises said rail —53— thereby throwing the same out of the path of travel of said pin —44— and at the same time throwing the rail —54— into the path of travel of the pin —45—. The recess —78— at the left-hand end of the rail —54— is deepened to permit the pin —45— to travel in the same, while the cradle is being tilted by the pin —44—. It will be seen, however, that the pin —44— after leaving the last recess —55— at the left-hand end of the rail —53— must make almost a complete revolution before its engagement with said cam surface —58— and that as shown in Fig. —2— at the time said pin —44— engages said cam surface the pin —45— has already passed the left-hand recess —55— in the rail —54— so that before said pin —45— can engage the last-named recess —55— it must almost have completed a second revolution. The carriage —34— is thus maintained at this limit of its movement exactly double the length of time that it remains at rest at intervals of travel from one limit of movement to the other. The shutter is so geared relatively to the pins —44— and —45— as to expose the film twice during the period of rest of the carriage at each limit of the movement thereof and the mechanism for imparting longitudinal movement to the film is so timed relatively to the movements of the disks —42— and —43— as to shift the film longitudinally during the interval between the two exposures of the same while the carriage remains at either limit of its movement. The manner of accomplishing this result will more fully appear hereinafter. It will be understood, of course, that the rails —53— and —54— constitute rack-bars and are identical with each other and opposed, and that the rail —54— is provided at its right-hand end with the cam surface —58— and recess —59—.

In order to maintain the cradle in the respective positions to which it is moved by the action of the pins —44— and —45— during its travel from one limit of its movement to the other we have provided latches —60— and —61— one of which is pivotally mounted on a bracket —62— secured to the front wall of the casing —1— and the other of which is similarly secured to a projection —63— at the free end of said bracket. Each of said latches consists of a bell-crank-lever pivoted at its elbow portion and each having one arm depending and provided adjacent its free end with a recess —64— one wall of which is slightly beveled as shown in detail at —65— in Fig. —8—, the free ends of said levers being tapered below said recess to provide cam surfaces —66—. The other arms of said levers —60— and —61— project toward each other and each of the same is normally maintained in engagement with a pin —67— disposed in its path by means of a flat spring —68— bearing at its free end against the depending arm of said lever. The pins —44— and —45— are adapted when raising either of the rails —53— or —54— to throw the free edge of the latter into engaging relation to the beveled portion —65— of the lower wall of the recess —64—. In so doing the said rail —53— for example, must engage the cam surface —66— at the lower end of the depending arm of the lever —60— and force the same out of its path against the action of the spring —68— and after passing said cam surface —66— and being brought into engaging relation to the beveled surface —65— the spring —68— forces the arm of the lever —60— inwardly thereby causing the said beveled surface —65— to raise the free edge of the rail —53— so that the same enters the rear portion of said recess —64— from which it cannot readily escape. In order to enable said latches or levers —60— and —61— to be disengaged from said rails —53— and —54— at the moment that the latter are to be relatively reversed as to their engaging relation to the pins —44— and —45— recesses —69— are provided in said rails —53— and —54— in which the said latches or levers —60— —61— respectively, are received as the carriage reaches a limit of its movement so that at such time the said cradle may be rocked to throw the previously disengaged free edge of one of its rails into engagement with one of said latches. This mechanism is very essential to obviate the possibility of accidental shifting of position of the cradle during its movement from one limit to the other.

As previously described the engagement of the periphery of the disk —46— with the walls of the recesses —56— serves to prevent movement of the carriage from the time that the pin —44— leaves one of said recesses —55— until its engagement in the next succeeding recess —55—. In Fig. —6— the free space between said disk and the wall of the recess is greatly exaggerated as a snug fit must be maintained but to further assure rigidity of the carriage during the interval of exposure of the film we have provided on the shaft —26— a plurality of disks —70— spaced the same distance apart as the recesses —55— in the rails of the cradle. The said disks —70— are six in number, however, and each of the same is, as shown in detail in Figs. —5— and —10—, slightly more than semi-circular in shape so that its periphery extends through an arc of about 220 degrees. On the right-hand end rail —35— of the carriage —34— there is mounted a projection —71— provided in its upper end with a recess —72— flared at one end as at —73—. The width of the recess —72— is substantially identical with the thickness of the disks —70— so that the latter in entering said recesses fit as snugly therein as can be done and still provide a running joint between the two parts. The said disks —70— are so disposed on said shaft —26— and with relation to the said rail —35— of the carriage that at each movement of the latter from one limit to the other the said projection —71— is brought into engaging relation to one of said disks —70—, the latter entering the same and remaining in engagement therewith during the interval of exposure of the film. It will be noted that this interval is greater than the intervals of movement of the carriage, that is to say, the latter is in motion one-third of the time, approximately, and at rest two-thirds of the time, approximately. The flaring mouth of the recess —72— serves to enable the disks —70— to enter even though said projection —71— shall not be brought exactly into proper position. In the course of time the walls of the recesses —55— may wear and a slight variation in distance traveled by the carriage may thus occur. The flaring of the recesses —72— enables the disks —70— to correct the movement of the carriage and maintain the same exact, as will be obvious. It will be seen from the foregoing that the position of the disks —70— on the shaft —26— is such that the same are in engagement with the projections —71— during the time that the recess in the shutter is passing the opening —7—, the gearing being arranged to assure this result. As previously stated the film is mounted upon the carriage —34— and is fed from a roll —31— onto a take-up roll —32— both said rolls being mounted in the rectangular casings —33—. Mounted upon the end pieces —35— of said carriage are vertically disposed plates —74— extending parallel with each other and each provided adjacent its rear edge with a guide groove —75— in which flanges —75ᵃ— on the end walls of the casings —33— are received, the latter being thus held against lateral movement relatively to said plates —74—. In the said end walls of said casings —33— are central openings for the passage therethrough of shafts —76— and —77— respectively, the upper shaft —76— serving merely to afford a support on which the roll —32— is revoluble while said shaft —77— is rigidly connected with the roll —32— and is actuated by mechanism, which will be hereinafter described, to rotate said roll at intervals to take up film. The said shaft —77— is hollow and passes loosely through the roll or spool —32—, the latter being held against rotation relatively thereto by means of a pin —79— (Figs. —16— and —17—) on said shaft entering a recess in one end of the spool. The said shafts —76— and —77— pass through openings in the plates —74— and thus serve to support the casing —33— the lower one of the latter being further rigidly secured to said plates —74— in any suitable manner.

In passing from the roll —31— to the roll —32— the film is trained between two pairs of idle rolls —80— —81— and —82— —83— (Fig. —3—) respectively, the rolls of each pair being journaled at their reduced ends in plates —84— and —85— respectively, secured to the said side plates —74—, one roll of each pair being movable relatively to the other and maintained at one limit of its movement by means of a spring —86— and —87— respectively, in a well-known manner. The said film —11— is thus engaged between the two pairs of idle rolls and is caused to move in a vertical plane in passing from the roll —31— to the roll —32—. The said film is moved longitudinally at regular intervals by means engaging the film only and having no connection or engagement with either of the rolls —31— —32— this being a very essential feature of the invention as obviating the use of complicated mechanism for compensating for variations in diameters of the feed and take-up rolls. This mechanism comprises a pair of opposed bars —88— equipped adjacent their ends, as shown in detail in Figs. —22—, —23— and —24—, with opposed friction surfaces —89— between which the film is engaged adjacent its side edges. The said bars —88— are normally maintained in engagement with the film by means of the springs —90— engaging the same and forcing them toward each other in the manner of a wire-clothes-pin. Adjacent the free ends of each bar there is provided a rectangular recess —91— the recesses of opposed bars opposing each other and receiving the square portions —92— of shafts —93—, the latter when turned to the position indicated in Fig. —23— separating said bars —88— against the action of said springs —90— thus releasing said bars from engagement with the film —11—. The said shafts —93— are longitudinally movable in guides —94— and —95— (Fig. —1—) in which they are likewise revoluble and are maintained normally at the lower limits of their movement by means of the coiled springs —96— disposed between the guide —95— and a collar or washer —97— disposed on said shaft and resting upon the upper end of the square portion —92— of the shaft —93—. Similar collars or washers —98— rest upon the shoulders —99— (Fig. —25—) formed at the base of the square portion —92— of each shaft and serve to support said bars —88—. At their lower ends the said shafts —93— are provided with cross-heads —100— (Figs. —18— and —19—) each of which is adapted to be engaged by a pin —101— on the hub —102— of a cam —103— to turn said shafts —93— at intervals to separate said bars —88— against the action of the said springs —90—. The said cam —93— presents what may be termed a spiral cam surface —104— that is, each point in said surface —104— is disposed at a gradually increasing distance from the axis of rotation of the hollow shaft —108— on which said cam is mounted. The said surface —104— is not regular in its contour but is stepped at intervals so as to engage and raise said shafts —93— a given distance at intervals during the movement of said cam as will be hereinafter more particularly pointed out. The shaft —93— is raised by the cam surface —104— until the point of greatest radius of the latter has passed the lower end of said shaft whereupon the springs —96— force said shafts down upon the points of least radius of said cam.

On one side of the cam adjacent the point of greatest radius thereof there is mounted a projection —105— which is adapted to engage the cross-head —100— at the end portion opposite that engaged by the pin —101— and which turns said shaft —93— in the opposite direction from that in which it is turned by said pin —101—. In Figs. —20— and —21— we have clearly shown the two positions of the shaft —93—, Fig. —20— showing it turned to that limit of its movement by the pin —101— in which the bars are separated as shown in Fig. —23— and Fig. —21— showing it turned to the other limit of its movement by the projection —105— and in which the bars engage the film as shown in Fig. —22—. The last-named position of the shafts —93— is maintained during their downward stroke upon completion of which said shafts rest upon the portion of least radius of the cam. This said portion of least radius is concentric with the axis of rotation of the cam and extends through an arc of substantially sixty degrees and while the cam is traveling through this arc the pin —101— engages the cross-head —100— and turns the shaft —93— through an arc slightly in excess of ninety degrees so that the diagonally opposed corners of the square portion —92— of said shaft pass a line of dead-center perpendicular to the surfaces of the bars —88— engaged by said corners. Hence, the tendency of the pressure imparted by the springs —90— through the bars —88— upon said square portion of the shaft —93— would be to continue the direction of rotation imparted by the pin —101—. This is prevented by a pin —106— in said shaft —93— which at its free end engages the outer surface of the plate —74— and limits the rotation of said shaft —93— in said direction. This movement of the shaft releases the bars —88— from engagement with the film and further rotation of the cam —103— merely serves to elevate said shaft —93— and bars —88— until the projection —105— on said cam engages the cross-head —100— and returns said shaft —93— to the position shown in Figs. —21— and —22— whereby the said bars —88— again engage the film —11—. It will be understood, of course, that the last-named movement of the shaft —93— is completed before the portion of greatest radius of the cam has passed the lower end of said shaft so that said bars firmly engage the film —11— before they move downwardly. The portion of greatest radius of the cam —103— is concentric with its axis of rotation through a short arc sufficient to obviate possibility of vertical movement of the bars —88— during their engagement with the film and before the shafts —93— are tripped. The said shaft —93— is provided adjacent its lower end portion with a plurality of ratchet teeth —106— the lower faces of which are perpendicular to the axis of the shaft. Mounted on the bracket —94— is a spring actuated pawl —107— which is adapted to engage said ratchet teeth —106— as said shaft is raised by the cam —103—. The shaft —93— is raised at intervals and is supported by said pawl —107— at each succeeding higher elevation. As said shaft is turned by the engagement of the cross-head —100— with the projection —105— the said ratchet teeth are thrown out of engaging relation to the pawl so that the latter bears only against a smooth portion of the surface of said shaft and consequently does not interfere with the downward movement of the latter when tripped. The purpose of thus supporting the shaft —93— is to relieve the cam —103— from the pressure of the springs —96—. This, however, is unimportant and may be omitted without effecting the efficiency of operation of the device.

As previously stated, the shaft —108— is hollow and through the same there is passed a shaft —109— provided with a key —110— which is longitudinally movable in a slot —111— in said shaft —105— as shown in Fig. —2—. The said shaft —109— carries the spur gear —112— at one end which meshes with a smaller spur gear —113— on a shaft —113ᵃ— actuated by the crank —30—. It is essential that the said shaft —109— should be longitudinally movable relatively to the shaft —108— and also to the carriage —34— and that the shaft —108— should be revoluble only in said carriage. Accordingly, the slot —111— in the shaft —108— is made of sufficient length to enable the shafts —108— and —109— to move longitudinally relatively to each other a distance equal to the distance traveled by the carriage from one limit of its movement to the other.

As heretofore pointed out the shaft —77— is hollow and is passed through the take-up spool or roll —32— with which it is maintained rigid by means of the pin —79— entering a recess in one end of said spool, as shown in Figs. —14— and —15—. The said shaft —77— receives a shaft —114— rotatable relatively thereto but held against longitudinal movement relatively to the same by means of flanging one end of the shaft —77— into the groove —115— in said shaft —114—. The said shaft —114— is equipped between its ends with a bowed spring —116— mounted in a recess in the same and bearing upon the inner wall of the shaft —77— thereby producing a frictional contact or clutch effect between the two shafts whereby they are held against free relative movement. On one end of the shaft —114— is a ratchet wheel —117— which is beveled on its inner corner as at —118— and is engaged by a pawl —119— pivotally mounted upon the free end of a Z-shaped bracket —120— secured to one of the side plates —74— at one end, the free leg thereof being provided with an opening into which one end of the shaft —114— projects. The said bracket —120— is secured to the plate —74— by means of a screw —121— between which and the leg of said bracket through which said screw passes a compression spring —122— is interposed, the latter serving to hold said bracket yieldingly in position. In order to remove and replace the take-up roll —32— it is necessary to withdraw the shaft —77— therefrom and for this purpose it is necessary that the bracket —120— should be capable of being swung out of the path of said shaft and said ratchet —117—. The spring controlled pivotal connection of said bracket with said plate —74— permits or enables it to be accomplished in an obvious manner.

Secured to one of the bars —88— at one end is a bracket —123— having a depending projection —124— to which a ratchet rack bar —125— is pivotally secured at one end. This is shown more particularly in Figs. —3— and —4—, said rack bar —125— being maintained in engagement with the ratchet wheel —117— by means of a spring —126—. It will be noted that upon the downward movement of the bars —88— the said rack bar —125— will engage and rotate the ratchet wheel —117— and through the frictional engagement of the shaft —114— with the hollow shaft —77— rotate the latter so as to take up on the roll —32— the amount of film which has been pulled down from the feed roll —31— by said bars —88—. The pawl —119— prevents rotation of the said ratchet wheel —117— in the reverse direction and as the bars —88— are carried upwardly by the action of the cams —103— the rack bar will be carried with the same without imparting reverse rotation to the ratchet wheel —117—.

All of the operating mechanism is actuated by means of the crank —30—. The latter is rotatably mounted on the shafts —29— and —113ª— (Figs. —30—, —31— and —32—), the hub of said crank being provided with a stepped opening according in diameter in its respective parts with said shafts —29— and —113ª—. Each of the latter is provided with an opening —127— and —128— respectively, adapted to receive pins —129— and —130— respectively, both of which are rigidly mounted in a block —131—, slidably mounted on said crank —30—. Said pins —129— and —130— are of different lengths so that the pin —130—, which is the shorter, may be withdrawn from its engagement with the opening —128— in the shaft —113ª— while the pin —129— remains in engagement with the opening —127— in the shaft —113ª—. Thus the last-named shaft may be actuated independently of the first-named. The said block —131— is adjusted in position by means of the thumb screw —132—, the threaded shank of which enters a threaded opening in said block —131— and passes through a longitudinal slot —133— in said crank —30—. A small compression spring —134— disposed in said slot —133— bears upon said screw —132— and maintains said block —131— normally at the inner limit of is movement whereby said pins —129— and —130— are maintained in engagement with both said shafts —29— and —113ª—. Mounted in said crank —30— is a small screw —135— which is adapted to enter a recess —136— in a disk —137— disposed between the head of said screw —132— and said crank —30—. The said disk —137— and screw —135— serve to determine the outer limits of movement of said block —131—, that is to say, when the periphery of said disk —137— engages said screw —135— the pin —130— is withdrawn from engagement with the shaft —29— but the pin —129— is still in engagement with the shaft —113ª—. By moving the block —131— rearwardly until the screw —135— is received into the recess —136— in the disk the pin —129— will be withdrawn from engagement with the shaft —113ª— and said crank will then be freely rotatable relatively to both said shafts. The set screw —132— serves to hold the block —131— in any position to which it is moved by merely turning said screw to draw said block simultaneously in engagement with crank —30— as will be obvious. It will be noted from the foregoing that when the crank —30— engages the shaft —113ᵃ— only the film feeding means i. e. the bars —88— and take-up roll —32— will be actuated while the shutter and the carriage shifting mechanism remains inactive. Thus, if two or more sets of pictures are displayed on a single film, the operator may, by operating the shaft —113ᵃ— feed the film down until he reaches the part that he wishes to throw on a screen in giving an exhibition. This, however, is very seldom necessary or desired, and, if desired, the operator would preferably resort to the means for feeding the film hereinafter described, as disturbance of the engagement of the crank with both shafts actuated thereby may result in confusion of the time of shifting the film with relation to the position of the carriage.

While the operation of the device will probably be fully understood from the foregoing description, a brief review of the same in which description of some minor parts of the device will be included may be of service in obtaining a fuller comprehension of the mechanism.

The machine may be loaded in daylight in substantially the same manner as the kodak. The roll of film backed by a web of black paper is inserted into the upper casing —33— and the shaft —76— then inserted through the end plates —74— and the end walls of said casing —33— and through the hollow spool or roll —31—. The free end of the web of block paper is then passed between the upper guide rolls —80— —81— thence between the bars —88— and guide rolls —82— —83— and said free end then passed through the slot in the take-up roll —32— which is provided as usual. All of this is best shown in Fig. —3—. The said take-up roll is usually first inserted in place. The cover is then replaced on the back of the casing —1— and the paper web is then taken up on the roll —32— until the film reaches a position opposite the opening —7—. It is immaterial so far as the working mechanism is concerned whether the camera be of the fixed focus type or adjustable focus type. If the focus is adjustable it would, of course, be requisite to primarily ascertain the distance of the object to be photographed from the camera and properly adjust the position of the lens to focus the picture on the film. Any of the well-known means for effecting such result may be resorted to and special means may be provided in this machine for easily focusing on the film. The take-up roll —32— may now be actuated either by releasing the pin —130— from engagement with the shaft —29— and thus rotating only the shaft —113ᵃ— by means of the crank —30— or the hand-operated device provided for the purpose and shown in Fig. —1— may be utilized. The said hand-operated device consists of a shaft —138— which is longitudinally and revolubly movable in a bearing in the right-hand side wall of the casing —1— and is provided in its inner end with a rectangular recess in which the square tapered end —139— on the shaft —77— is adapted to be received when said shaft —138— is moved inwardly into engagement with said square end. The shaft —138— is normally maintained out of engagement with the shaft —77— and is provided between its ends with two annular grooves one of which is shown at —139ᵃ— in which a latch —140— on the side wall of the casing is adapted to be received, said latch being shown in engagement with the innermost of said annular recesses and thus maintaining said shaft —138— out of engagement with the shaft —77—. By rotating the shaft —77— by means of said shaft —138— the film or the web to which it is secured is taken up on the roll —132—. The said webs are usually provided with some indicating mark which may be seen through an opening in the casing covered with ruby or orange glass and which indicates when the film is disposed in focal relation to the lens. After the web has been taken up to an extent sufficient to bring the end of the film opposite the opening —7— the shaft —138— is returned to the position indicated in Fig. —3—. It is, of course, essential in order to effect engagement of the shaft —138— with the shaft —77— that the carriage —34— be at the right-hand limit of its movement and it is desirable that it should be moved to this limit before inserting a fresh roll of film. If, however, the operator should omit to so adjust the position of the carriage, the crank —30— may be operated as previously indicated to actuate the bars —88— and take-up roll —32— to primarily bring one end of the film opposite the opening —7—. After the film has been so brought down the block —131— is moved inwardly until the pin —130— enters the opening —128— in the shaft —129— and by then turning the crank the cams —103— as well as the carriage shifting mechanism and shutter actuating mechanism will be set in motion.

We have previously stated that the shafts —26— and —23— rotate at equal speed so that during each revolution of the shaft —26— the shutter —12— will make one complete revolution thus exposing the film surface at this time disposed opposite the opening —7—. The shafts —29— and —113ᵃ— rotate at equal speeds and the gear —28— on the shaft —29— is of such diameter relatively to the relative diameters of the gears —27— and —112— that said shaft —26— will make exactly six revolutions for one revolution of the shaft —109—. Thus the said shaft —23— will also make six complete revolutions for each complete revolution of said shaft —109— and the carriage —34— will thus be moved five times during such six revolutions and will remain at rest during the sixth revolution or between the sixth and seventh. Simultaneously with the completion of the sixth revolution of said shaft the shafts —93— will be tripped and thus move the film downwardly a distance equal to the height of the opening —7—, approximately.

The crank may be turned at a relatively high speed so as to cause from eight to fifteen exposures per second to be made and in order to insure relative uniformity of speed, that is to prevent any jerky movement of the crank, we provide in the bottom of the casing —1— a fly-wheel —14—, which is revolubly mounted on a shaft —142— which carries a spur pinion —143— rigid therewith. The said pinion —143— meshes with a spur gear —144— on the lower end of the shaft —123— and makes substantially three revolutions to one revolution of the latter. The casing is provided with a false bottom —145— between which and the lower wall —146— thereof said fly wheel is disposed, the rim of the latter being preferably rendered relatively heavy to increase its governing power, as will be obvious.

The machine is constructed and intended to receive rolls of film such as are usually employed in kodaks, such rolls being best adapted to the purpose. If it should be desired to substitute other sensitized members, such as plates, which are inflexible, the mechanism on the carriage would require modification to meet this condition. Such modification is easily within the skill of a mechanic versed in the art and illustration and description thereof is, therefore, deemed superfluous and is accordingly omitted especially as the limited area of the plate capable of exposure would of itself practically prohibit its use for the purpose.

After the film has been exposed over its entire surface it is removed and developed in the ordinary manner and a positive copy made therefrom by surface contact with a second film coated, preferably, with a lantern slide emulsion and after the latter has been developed, fixed and dried it is rolled upon a spool similar to the spool —31— and its other end engaged by a take-up roll —32—. The images on this film, although positive, are still inverted so that when projected on a screen they will appear right side up, the projection being effected through the lens of the camera.

After the positive film is mounted in the machine and the lantern equipped with the condenser properly disposed behind the now open back of the machine, the take-up roll is actuated by means of the shaft —138— to bring the first picture on film into register with the opening —7—, and, if the lens (as is intended) is adjustable toward and from the plane of travel of the film, the same is then adjusted to focus the picture on the screen. The crank —30— is then operated thus bringing all pictures successively into position to be projected on the screen.

The machine is intended mainly for amateur use and parlor exhibitions and is well adapted to afford amusement in the home.

We claim as our invention:—

1. In a device of the kind specified, the combination with the lens and shutter, of film carrying means movable relatively to said lens, devices on said carrying means spring actuated in one direction for engaging and moving said film in a direction transverse to the direction of movement of said carrying means, and means for actuating said carrying means, shutter and film moving devices at relatively different intervals to expose successively different film areas.

2. In a device of the kind specified, the combination with the lens and shutter, of a carriage, a sensitized member carried thereby, mechanism spring actuated and operatively engaging said sensitized member to move the same in one direction at intervals, mechanism operatively engaging said carriage to move the same at intervals in a direction transverse to the direction of movement of said sensitized member, and a single operating member adapted to simultaneously actuate all of said mechanism and said shutter.

3. In a device of the kind specified, the combination with the lens and shutter, of a carriage adapted to carry a sensitized member, means for imparting intermittent motion to said carriage to reciprocate the same, means spring actuated for imparting movement to said sensitized member relatively to said carriage at intervals, and a single actuating member adapted to actuate said means and said shutter.

4. In a device of the kind specified, the combination with the lens and shutter, of a carriage adapted to carry a sensitized member, said carriage reciprocably movable in guides, means operatively engaging said carriage for imparting intermittent movement thereto from one limit of its movement to the other, means holding said carriage against movement between the intervals of actuation thereof, means on said carriage spring actuated for imparting movement to said sensitized member in a direction transverse to the direction of movement of said carriage at intervals, and a single operating member adapted to actuate said means and said shutter the former against the spring actuation thereof.

5. In a machine of the kind specified, the combination with the lens and shutter, of a carriage on which the sensitized member to be exposed is adapted to be carried, guides in which said carriage is reciprocally movable, rack-bars on said carriage, rotatable devices adapted to engage said rack-bars to impart intermittent movement to the carriage from one limit of its movement to the other, means controlling the engagement of said rotatable devices with said rack-bars to maintain only one at a time of the latter in actuating relation thereto and means on each of said rack-bars operatively engaged by its actuating device to reverse the operative relations of said respective rack-bars to the said actuating devices.

6. In a machine of the kind specified, the combination with the lens and shutter, of a carriage reciprocally movable in guides and adapted to carry the sensitized member to be exposed, a cradle pivotally mounted on said carriage and equipped with opposed rack-bars adapted to be varied in elevation, means operatively engaging said cradle to shift the relative positions of said rack-bars at intervals, and rotating means engaging said rack-bars one at a time in accordance with their respective relative elevations to impart movement to said carriage.

7. In a device of the kind specified, the combination with the lens and shutter of a carriage movable relatively to said lens, a film reel and a take-up drum on said carriage, devices on said carriage for moving the film from the reel onto the take-up drum and a single actuating member common to said shutter, said carriage and said film moving devices and adapted to actuate all of the same at different successive intervals to successively expose different film areas.

8. In a machine of the kind specified, the combination with the lens and shutter, of a carriage reciprocally movable in guides and adapted to carry the sensitized member to be exposed, a cradle pivotally mounted on said carriage and equipped with opposed rack-bars adapted to be varied in elevation, means operatively engaging said cradle to shift the relative positions of said rack-bars at intervals, and rotating means engaging said rack-bars one at a time in accordance with their respective relative elevations to impart intermittent movement to said carriage in one direction.

9. In a machine of the kind specified, the combination with the lens and shutter, of a carriage reciprocally movable in guides and adapted to carry the sensitized member to be exposed, a cradle pivotally mounted on said carriage and equipped with opposed rack-bars adapted to be varied in elevation, means operatively engaging said cradle to shift the relative positions of said rack-bars at intervals, and rotating means engaging said rack-bars one at a time in accordance with their respective relative elevations to impart intermittent movement to said carriage in one direction and devices carried by said rotating means engaging said rack-bars to hold same against movement between the intervals of actuating thereof.

10. In a machine of the kind specified, the combination with the lens and shutter, of a carriage movable in guides and adapted to carry the sensitized member to be exposed, a cradle pivotally supported on said carriage, opposed rack-bars mounted on said carriage, rotating means disposed in actuating relation to said rack-bars and adapted to engage one at a time thereof to move said carriage alternately, from one limit to the other and means operatively engaging said cradle as said carriage reaches a limit of its travel to rock the same, whereby one of said rack-bars is thrown out of actuating relation to said rotating means and vice versa.

11. In a machine of the kind specified, the combination with the lens and shutter, of a carriage movable in guides and adapted to carry the sensitized member to be exposed, a cradle pivotally supported on said carriage, opposed rack-bars mounted on said carriage, rotating means disposed in actuating relation to said rack-bars and adapted to engage one at a time thereof to move said carriage alternately, from one limit to the other and means operatively engaging said cradle as said carriage reaches a limit of its travel to rock the same, whereby one of said rack-bars is thrown out of actuating relation to said rotating means and vice versa; and devices carried by said rotating means engaging said rack-bars to hold said carriage against movement between the intervals of actuation thereof.

12. In a machine of the kind specified, the combination with the lens and shutter, of a carriage movable in guides and adapted to carry the sensitized member to be exposed, a cradle pivotally supported on said carriage, opposed rack-bars mounted on said carriage, a pair of rotatable members each carrying a pin adapted to engage said respective rack-bars to impart movement to said carriage in respectively opposite directions, and means on each rack-bar adapted to be engaged by the pin actuating the same to throw it out of actuating relation thereto, whereby the other rack-bar is thrown into actuating relation to the pin of the other member.

13. In a machine of the kind specified, the combination with the lens and shutter, of a carriage movable in guides and adapted to carry the sensitized member to be exposed, a cradle pivotally supported on said carriage, opposed rack-bars mounted on said carriage, a pair of rotatable members each carrying a pin adapted to engage said respective rack-bars to impart movement to said carriage in respectively opposite directions, and means on each rack-bar adapted to be engaged by the pin actuating the same to throw it out of actuating relation thereto, whereby the other rack-bar is thrown into actuating relation to the pin of the other member, and a member carried by each rotatable member adapted to engage and hold against movement the rack-bar being actuated between the intervals of actuation of the same.

14. In a machine of the kind specified, the combination with the lens and shutter, of a carriage movable in guides and adapted to carry the sensitized member to be exposed, a cradle pivotally supported on said carriage, opposed rack-bars mounted on said carriage, a pair of rotatable members each carrying a pin adapted to engage said respective rack-bars to impart movement to said carriage in respectively opposite directions, and means on each rack-bar adapted to be engaged by the pin actuating the same to throw it out of actuating relation thereto, whereby the other rack-bar is thrown into actuating relation to the pin of the other member, said respective pins being disposed on diametrically opposite sides of the axis of rotation of said members and one thereof imparting given movement to the carriage at each revolution and said rack shifting means being actuated thereby after the final movement of the carriage to one limit of its travel and before the other of said pins engages the other rack, whereby said carriage is maintained at rest during a revolution of said pins between actuating revolutions thereof.

15. In a machine of the kind specified, the combination with the lens and shutter and means actuating the latter, of a carriage movable in guides and adapted to carry the sensitized member to be exposed at intervals, two opposed rack-bars carried thereby, rotatable members each carrying a pin adapted to engage one of said rack-bars to impart a movement to said carriage during each revolution of said members, said rack-bars being each adapted to be thrown into and out of operative relation to its actuating pin, a cam at one end of each rack-bar adapted to be engaged by its actuating pin during the revolution of the latter next succeeding that imparting final movement to the carriage in one direction to throw said rack-bar out of operative relation to its actuating pin, connection between said rack-bars whereby when one is thrown out of actuating relation to its pin the other is thrown into actuating relation to its pin, said pins being disposed on diametrically opposite sides of the axis of rotation of said members and each rack-bar provided at its other end with a recess opposite the cam of the other in which its actuating pin is received, and travels freely during the shifting movement of said rack-bars, whereby said carriage is maintained at rest at either limit of its travel during a complete revolution of said members between actuating revolutions thereof.

16. In a machine of the kind specified, the combination with the lens and shutter and means actuating the latter, of a carriage movable in guides and adapted to carry the sensitized member to be exposed at intervals, two opposed rack-bars carried thereby, rotatable members each carrying a pin adapted to engage one of said rack-bars to impart a movement to said carriage during each revolution of said members, said rack-bars being each adapted to be thrown into and out of operative relation to its actuating pin, a cam at one end of each rack-bar adapted to be engaged by its actuating pin during the revolution of the latter next succeeding that imparting final movement to the carriage in one direction to throw said rack-bar out of operative relation to its actuating pin, connection between said rack-bars whereby when one is thrown out of actuating relation to its pin the other is thrown into actuating relation to its pin, said pins being disposed on diametrically opposite sides of the axis of rotation of said members and each rack-bar provided at its other end with a recess opposite the cam of the other in which its actuating pin is received and travels freely during the shifting movement of said rack-bars, whereby said carriage is maintained at rest at either limit of its travel during a complete revolution of said members between actuating revolutions thereof, and devices carried by said rotating members and engaging said rack-bar between the intervals of engagement of same by said pins to hold them against movement.

17. In a machine of the kind specified, the combination with the lens and shutter and means actuating the latter, of a carriage movable in guides and adapted to carry the sensitized member to be exposed at intervals, two opposed rack-bars carried thereby, rotatable members each carrying a pin adapted to engage one of said rack-bars to impart a movement to said carriage during each revolution of said members, said rack-bars being each adapted to be thrown into and out of operative relation to its actuating pin, a cam at one end of each rack-bar adapted to be engaged by its actuating pin during the revolution of the latter next succeeding that imparting final movement to the carriage in one direction to throw said rack-bar out of operative relation to its actuating pin, connection between said rack-bars whereby when one is thrown out of actuating relation to its pin the other is thrown into actuating relation to its pin, said pins being disposed on diametrically opposite sides of the axis of rotation of said members and each rack-bar provided at its other end with a recess opposite the cam of the other in which its actuating pin is received, and travels freely during the shifting movement of said rack-bars, whereby said carriage is maintained at rest at either limit of its travel during a complete revolution of said members between actuating revolutions thereof, a shaft operatively geared to said rotatable members and extending parallel with the guides of said carriage, segmental disks on said shaft spaced from each other a distance equal to the distance traveled by the carriage during each interval of engagement of a rack-bar with its actuating pin, and a bifurcated projection on the carriage receiving and engaging successively said segmental disks between the intervals of engagement of said racks with said pins.

18. In a device of the kind specified, the combination with the lens and shutter of film carrying means, devices for imparting intermittent movement thereto alternately in opposite directions, a shutter geared to said devices and exposing the film between the intervals of intermittent movement of said carrying means, means spring actuated in one direction and normally engaging the film for imparting movement to the latter relatively to said carrying means as the latter reaches the respective limits of its movement and means geared to said devices controlling the said film engaging means and actuating the same in the opposite direction during the travel of said carrying means between the limits of its movement.

19. In a device of the kind specified, the combination with the lens and shutter of film carrying means, devices for imparting intermittent movement thereto alternately in opposite directions, a shutter geared to said devices and exposing the film between the intervals of intermittent movement of said carrying means, means spring actuated in one direction and normally engaging the film for imparting movement to the latter relatively to said carrying means as the latter reaches the respective limits of its movement and means geared to said devices controlling the engagement of said film engaging means with said film and actuating the same in the opposite direction during the travel of said carrying means between the limits of its movement.

20. In a machine of the kind specified, the combination with the lens and shutter, of a carriage adapted to carry the sensitized film to be exposed, means for actuating the same to impart intermittent movement thereto relatively to the the lens alternately in opposite directions, reciprocable film engaging means on said carriage, spring actuated in one direction to impart movement to said film relatively to said carriage, and mechanically actuated devices actuating said film engaging means against the action of its springs and controlling the intervals of its actuation by the latter.

21. In a machine of the kind specified, the combination with the lens and shutter, of a carriage adapted to carry the sensitized film to be exposed, means for actuating the same to impart intermittent movement thereto relatively to the lens alternately in opposite directions, reciprocable film engaging means on said carriage, normally maintained in engagement with said film and spring actuated in one direction to impart movement to said film relatively to said carriage, and mechanically actuated devices controlling the engagement of said film engaging means with said film and actuating the same in the opposite direction.

22. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, reciprocally movable members on said carriage adapted to engage the film at intervals to move the same longitudinally, springs engaging said members to maintain them normally at one limit of their movement, and means adapted to be actuated to move said members against the action of said springs.

23. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, reciprocally movable members on said carriage adapted to engage the film at intervals to move the same longitudinally, springs engaging said members to maintain them normally at one limit of their movement, springs maintaining said members normally in engagement with said film, means for maintaining said members released from such engagement against the action of the last-named springs during their movement in one direction, and means for moving said members against the action of said first-named springs.

24. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, reciprocally movable members on said carriage adapted to engage the film at intervals to move the same longitudinally, springs engaging said members to maintain them normally at one limit of their movement, springs maintaining said members normally in engagement with said film, means for maintaining said members released from such engagement against the action of the last-named springs during their movement in one direction, and means for moving said members against the action of said first-named springs while released from engagement with said film.

25. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, reciprocally movable members on said carriage adapted to engage the film at intervals to move the same longitudinally, springs engaging said members to maintain them normally at one limit of their movement, rotatable means for moving said members against the action of said springs, springs maintaining said members normally engaged with said film, and means for maintaining said members released from such engagement during their movement against the action of said first-named springs.

26. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, reciprocally movable members on said carriage adapted to engage the film at intervals to move the same longitudinally, springs engaging said members to maintain them normally at one limit of their movement, rotatable cams operatively disposed relatively to said members to move the same against the action of said springs, and means operatively engaging said members and controlled by rotatable means moving with said cams to maintain said members engaged with the film during their travel in one direction and released from engagement therewith during their travel in the opposite direction.

27. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, reciprocally movable members on said carriage adapted to engage the film at intervals to move the same longitudinally, springs engaging said members to maintain them normally at one limit of their movement, rotatable cams operatively disposed relatively to said members to move the same against the action of said springs, and means operatively engaging said members and controlled by rotatable means moving with said cams to maintain said members engaged with the film during their movement by said springs and released from such engagement during their movement against the action of said springs.

28. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, reciprocally movable members on said carriage adapted to engage the film at intervals to move the same longitudinally, springs engaging said members to maintain them normally at one limit of their movement, a rotatable shaft on said carriage, cams carried thereby and adapted to operatively actuate said members against the action of said springs. means engaging said members for maintaining the same engaged with the film during their movement in one direction, means for maintaining them released during their movement in the other direction, and devices rotatable with said cams for actuating said last-named means.

29. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, reciprocally movable members on said carriage adapted to engage the film at intervals to move the same longitudinally, springs engaging said members to maintain them normally at one limit of their movement, a rotatable shaft on said carriage, cams carried thereby and adapted to operatively actuate said members against the action of said springs, means engaging said members for maintaining the same engaged with the film during their movement in one direction, means for maintaining them released during their movement in the other direction, devices rotating with said cams for actuating said last-named means, a member longitudinally movable relatively to said shaft and non-rotatable relatively thereto engaging and actuating the same, and a single actuating member common to said last-named member and said carriage actuating mechanism and operatively geared thereto.

30. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, idle rolls on said carriage between said spool and said take-up roll over which the film is trained, plungers reciprocally movable on said carriage, springs maintaining said plungers at one limit of their movement, a rotatable shaft on said carriage, cams carried thereby engaging said plungers and adapted to move the same against the action of said springs, film engaging members carried by said plungers, springs maintaining the same normally in engagement with the film, means on said plungers adapted to engage and actuate said members against the action of said springs, and coacting means carried by said plungers and said cams for oscillating said plungers at either limit of their movement to throw said members into and out of engagement respectively with said film.

31. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, idle rolls on said carriage between said spool and said take-up roll over which the film is trained, plungers reciprocally movable on said carriage, springs maintaining said plungers at one limit of their movement, a rotatable shaft on said carriage, cams carried thereby engaging said plungers and adapted to move the same against the action of said springs, film engaging members carried by said plungers, springs maintaining the same normally in engagement with the film, cams on said plungers adapted when the latter are oscillated on their axes to engage and actuate said members against the action of the springs engaging the same, lateral projections on said plungers, and means rotatable with said cams engaging the said projections at different intervals in the rotation thereof to turn said plungers in respectively opposite directions to control the engagement of said members with the said film.

32. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, reciprocally movable members on said carriage adapted to engage said film at intervals, means for reciprocating the same to impart longitudinal movement to said film, and reciprocal means adapted to operatively actuate said take-up roll during movement in one direction.

33. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, plungers reciprocally movable on said carriage, film engaging means carried by said plungers and incapable of movement longitudinally relatively thereto, springs normally maintaining said means engaged with said film, devices on said plungers and adapted when the latter are turned on their axes to actuate said film engaging means to release the film, springs maintaining said plungers normally at one limit of their movement, cams operatively disposed on said carriage and engaging said plungers and adapted to be rotated to actuate the latter against the action of said springs, means rotating with said cams and operatively engaging said plungers to turn the same on their axes in opposite directions at different intervals, a rotatable member having frictional engagement with the take-up roll, and a member movable with said plungers and operatively engaging said rotatable member during movement of the former in one direction to rotate the latter.

34. In a machine of the kind specified, the the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, idle rolls between said spool and take-up roll over which the film is trained, means engaging said film between said idle rolls and adapted to be actuated at intervals to impart longitudinal movement to said film, a member rotatable relatively to said take-up roll and frictionally engaging the latter, and means adapted to be actuated simultaneously with said film engaging means and operatively actuating said rotatable member.

35. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, idle rolls between said spool and take-up roll over which the film is trained, means engaging said film between said idle rolls and adapted to be actuated at intervals to impart longitudinal movement to said film, a hollow-shaft on said carriage operatively connected with and adapted to actuate said film engaging means, a member non-rotatable relatively to said hollow shaft and having sliding connection therewith, gearing between said member and an actuating member, means rotatable relatively to said take-up member and frictionally engaging the same, and means actuated simultaneously with said film engaging means operatively engaging said last-named rotatable means to actuate the same.

36. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, plungers reciprocally movable in guides on said carriage and rotatable on their axes, springs normally maintaining said plungers at one limit of their movement, a rotatable hollow shaft on said carriage, cams carried thereby engaging said plungers and adapted when said shaft is rotated to move said plungers at intervals against the action of said springs, lateral projections on said plungers, projections rotatable with said cams engaging said projections on said plungers at different intervals during the rotation of said cams to turn said plungers on their axes in respectively opposite directions, cams between the ends of said plungers, a pair of separable bars mounted on said plungers and held against movement longitudinally thereof and springs normally maintaining said bars in engagement with the film, said bars being engaged by said cams on said plungers and adapted to be separated thereby against the action of said springs when said plungers are turned on their axes in one direction.

37. In a machine of the kind specified, the combination with the lens and shutter, and means actuating the latter to expose film at intervals, of a carriage adapted to carry a film spool and a take-up roll, means for actuating said carriage to impart intermittent movement thereto relatively to the lens alternately in opposite directions, plungers reciprocally movable in guides on said carriage and rotatable on their axes, springs normally maintaining said plungers at one limit of their movement, a rotatable hollow shaft on said carriage, cams carried thereby engaging said plungers and adapted when said shaft is rotated to move said plungers at intervals against the action of said springs, lateral projections on said plungers, a projection disposed on either side of each cam rotatable therewith and traveling in planes disposed on opposite sides of the axes of rotation of said plungers adapted to engage the projections on the latter to turn the same on their axes in different directions at different intervals during their rotation, cams between the ends of said plungers, a pair of separable bars mounted on said plungers and held against movement longitudinally thereof and springs normally maintaining said bars in engagement with the film, said bars being engaged by said cams on said plungers and adapted to be separated thereby against the action of said springs when said plungers are turned on their axes in one direction.

38. In a camera, means for feeding a given length of film from a spool to a take-up roll, comprising clamping means adapted to engage the film adjacent its side edges, springs maintaining the same normally engaged with the film, means for imparting movement to the clamping means in one direction while engaging the film, means for simultaneously yieldingly actuating the take-up roll, means adapted to actuate said clamping means against the action of said springs to release the film, means for imparting movement in the other direction to said clamping means while the same are maintained disengaged from the film, and a single actuating member for operating all of said means.

39. In a camera, means for feeding a given length of film from a spool to a take-up roll, comprising reciprocally movable clamping means adapted to engage the film adjacent its side edges between the spool and take-up roll, means engaging said clamping members to throw the same into engagement with the film, devices engaging the same for throwing them out of engagement with the film, rotatable means operatively engaging said clamping means for imparting movement thereto in one direction, devices engaging the same for imparting movement thereto in the other direction, and means moving with said rotatable means and controlling the engagement of said clamping means with the film and adapted to maintain the same in engagement therewith while moving in one direction and disengaged therefrom while moving in the opposite direction, and a single actuating member controlling all of said means and devices.

40. In a camera, means for feeding a given length of film from a spool to a take-up roll, comprising reciprocally movable clamping means adapted to engage the film adjacent its side edges between the spool and take-up roll, springs engaging said clamping members to throw the same into engagement with the film, devices engaging the same for throwing them out of engagement with the film, against the action of said springs, springs operatively engaging said clamping means for normally maintaining the same at one limit of their reciprocal movement, manually actuated means adapted to move the same against the action of said last-named springs, manually actuated means for actuating said devices for releasing said clamping means from engagement with the film as said means reach the respective limits of their movement to cause the same to engage and release the film alternately, and a single actuating member controlling and adapted to actuate said means and devices.

41. In a camera, means for feeding a given length of film from a spool to a take-up roll, comprising reciprocally movable clamping means adapted to engage the film adjacent its side edges between the spool and take-up roll, springs engaging said clamping members to throw the same into engagement with the film, devices engaging the same for throwing them out of engagement with the film, against the action of said springs, springs operatively engaging said clamping means for normally maintaining the same at one limit of their reciprocal movement, manually actuated means adapted to move the same against the action of said last-named springs, a rotatable shaft, cams thereon having a partially spiral periphery relatively to the axis of rotation thereof and operatively engaging said clamping means for moving the same against the action of said springs, the portions of the cam surfaces radially nearest to and farthest from the axis of rotation being concentric with the latter to provide intervals of rest at the respective limits of movement of the clamping means, projections rotatable with said cams and adapted to engage and actuate said devices for throwing the clamping means out of engaging relation to the film during the intervals of rest of said clamping means at the respective limits of movement thereof, and means for actuating said shaft.

42. In a camera, means for feeding a given length of film from a spool to a take-up roll, comprising reciprocally movable clamping means adapted to engage the film adjacent its side edges between the spool and take-up roll, springs engaging said clamping members to throw the same into engagement with the film, devices engaging the same for throwing them out of engagement with the film, against the action of said springs, springs operatively engaging said clamping means for normally maintaining the same at one limit of their reciprocal movement, manually actuated means adapted to move the same against the action of said last-named springs, a rotatable shaft, cams thereon having a partially spiral periphery relatively to the axis of rotation thereof and operatively engaging said clamping means for moving the same against the action of said springs, the portions of the cam surfaces radially nearest to and farthest from the axis of rotation being concentric with the latter to provide intervals of rest at the respective limits of movement of the clamping means, projections rotatable with said cams and adapted to engage and actuate said devices for throwing the clamping means out of engaging relation to the film during the intervals of rest of said clamping means at the respective limits of movement thereof, rotatable means yieldingly engaging the take-up roll to rotate the same, and means operatively engaged with said clamping means and engaging the last-named rotatable means during movement of said clamping means in one direction to actuate said take-up roll.

43. In a machine of the kind specified, a film carriage, a lens, a rotatable shutter, a main-shaft, gearing between the same and said shutter for rotating the latter at equal speed therewith, said gearing including a countershaft, coacting devices on said carriage and said countershaft for imparting intermittent movement to the former alternately in opposite directions, film shifting devices on said carriage, a shaft controlling and actuating the same, said shaft being operable independently of the first-named shaft, a single crank, two relatively rotatable shafts adapted to be engaged and simultaneously actuated thereby, and gearing between said respective first-named and said respective last-named shafts.

44. In a machine of the kind specified, a film carriage, a lens, a rotatable shutter, a main-shaft, gearing between the same and said shutter for rotating the latter at equal speed therewith, said gearing including a countershaft, coacting devices on said carriage and said countershaft for imparting intermittent movement to the former alternately in opposite directions, film shifting devices on said carriage, a shaft controlling and actuating the same, said shaft being operable independently of the first-named shaft, a single crank, a hollow-shaft adapted to be engaged and rotated thereby, a solid shaft passing through and rotatable relatively to said hollow-shaft adapted to be engaged and rotated by said crank, gearing between said hollow-shaft and one of said first-named shafts, and gearing between said solid shaft and the other of said first-named shafts.

45. In a machine of the kind specified, a film carriage, a lens, a rotatable shutter, a main-shaft, gearing between the same and said shutter for rotating the latter at equal speed therewith, said gearing including a countershaft, coacting devices on said carriage and said countershaft for imparting intermittent movement to the former alternately in opposite directions, film shifting devices on said carriage, a shaft controlling and actuating the same, said shaft being operable independently of the first-named shaft, a single crank, two relatively rotatable shafts adapted to be engaged and simultaneously actuated thereby, and gearing between said respective first-named and said respective last-named shafts, and devices adjustably disposed on and non-rotatable relatively to said crank controlling the engagement of the latter with the said last-named shafts.

46. In a machine of the kind specified, a film carriage, a lens, a rotatable shutter, a main-shaft, gearing between the same and said shutter for rotating the latter at equal speed therewith, said gearing including a countershaft, coacting devices on said carriage and said countershaft for imparting intermittent movement to the former alternately in opposite directions, film shifting devices on said carriage, a shaft controlling and actuating the same, said shaft being operable independently of the first-named shaft, a single crank, two relatively rotatable shafts adapted to be engaged and simultaneously actuated thereby, and gearing between said respective first-named and said respective last-named shafts, a member slidable on said crank, and a plurality of projections carried thereby adapted to enter recesses in the respective last-named shafts to engage the same with said crank.

47. In a machine of the kind specified, a film carriage, a lens, a rotatable shutter, a main-shaft, gearing between the same and said shutter for rotating the latter at equal speed therewith, said gearing including a countershaft, coacting devices on said carriage and said countershaft for imparting intermittent movement to the former alternately in opposite directions, film shifting devices on said carriage, a shaft controlling and actuating the same, said shaft being operable independently of the first-named shaft, a single crank, two relatively rotatable shafts adapted to be engaged and simultaneously actuated thereby, and gearing between said respective first-named and said respective last-named shafts, a member slidable on said crank, and a plurality of projections carried thereby adapted to enter recesses in the respective last-named shafts to engage the same with said crank, said projections being of respectively different lengths whereby one of the same may maintain said crank in engagement with one of said last-named shafts and rotatably free relatively to the other thereof.

48. In a machine of the kind specified, a film carriage, a lens, a rotatable shutter, a main-shaft, gearing between the same and said shutter for rotating the latter at equal speed therewith, said gearing including a countershaft, coacting devices on said carriage and said countershaft for imparting intermittent movement to the former alternately in opposite directions, film shifting devices on said carriage, a shaft controlling and actuating the same, said shaft being operable independently of the first-named shaft, a single crank, two relatively rotatable shafts adapted to be engaged and simultaneously actuated thereby, and gearing between said respective first-named and said respective last-named shafts, a member slidable on said crank, and a plurality of projections carried thereby adapted to enter recesses in the respective last-named shafts to engage the same with said crank, said recesses in said shafts being so disposed relatively to the mechanisms actuated by the same respectively as to insure such actuation thereof at proper relative intervals.

49. In a machine of the kind specified, a film carriage, a lens, a rotatable shutter, a main-shaft, gearing between the same and said shutter for rotating the latter at equal speed therewith, said gearing including a countershaft, coacting devices on said carriage and said countershaft for imparting intermittent movement to the former alternately in opposite directions, film shifting devices on said carriage, a shaft controlling and actuating the same, said shaft being operable independently of the first-named shaft, a single crank, a hollow-shaft adapted to be engaged and rotated thereby, a solid shaft passing through and rotatable relatively to said hollow-shaft adapted to be engaged and rotated by said crank, gearing between said hollow-shaft and one of said first-named shafts, and gearing between said solid shaft and the other of said first-named shafts, said gearing being arranged to cause the shaft actuating the carriage and shutter to make a given number of revolutions to a single revolution of the shaft actuating the film shifting devices, the latter being rotatable by said crank independently of the former.

50. In a moving picture camera, a reciprocable carriage, a spool carrying the photographic film and a take-up spool for said film mounted on said carriage, means for imparting motion to said carriage laterally of the direction of travel of film thereof at predetermined intervals, and film engaging mechanism on said carriage for unwinding predetermined lengths thereof from said first named spool.

51. In a moving picture camera, a reciprocable carriage, a spool carrying the photographic film and a take-up spool for said film mounted on said carriage, means for imparting motion to said carriage laterally of the direction of travel of film thereof at predetermined intervals, and reciprocable film engaging mechanism on said carriage for unwinding predetermined lengths thereof from said first-named spool.

52. In a moving picture camera, a reciprocable carriage, a spool carrying the photographic film and a take-up spool for said film mounted on said carriage, means for imparting motion to said carriage laterally of the direction of travel of film thereof at predetermined intervals, reciprocable film engaging mechanism on said carriage for unwinding predetermined lengths thereof from said first-named spool, and gearing between said reciprocable mechanism and said take-up spool for actuating the latter.

53. In a moving picture camera, a reciprocable carriage, a spool carrying the photographic film and a take-up spool for said film, reciprocable film engaging mechanism on said carriage for unwinding predetermined lengths thereof from said first-named spool, means for imparting motion to said carriage laterally of the direction of travel of film thereof at predetermined intervals, and gearing between said reciprocable mechanism and said take-up spool for actuating the latter, said gearing including means whereby the reciprocable mechanism is free to move in one direction without actuating said take-up spool.

54. In a moving picture camera, the combination with a fixed focal field, of a carriage adapted to reciprocably travel laterally of said field, means for imparting intermittent movement to said carriage during its travel in opposite directions, a film spool holder on said carriage, a film take-up drum holder thereon, the film adapted to travel in the focal plane from said spool to said drum transversely of the direction of travel of said carriage, and reciprocable film engaging means on said carriage adapted during movement in one direction to unwind a fixed length of film from said spool.

55. In a moving picture camera, the combination with a fixed focal field, of a carriage adapted to reciprocably travel laterally of said field, means for imparting intermittent movement to said carriage during its travel in opposite directions, a film spool holder on said carriage, a film take-up drum holder thereon, the film adapted to travel in the focal plane from said spool to said drum transversely of the direction of travel of said carriage, reciprocable film engaging means on said carriage adapted during movement in one direction to unwind a fixed length of film from said spool and means effecting actuating engagement between said reciprocable film engaging means and said take-up drum holder as the former moves in the direction for unwinding film from said spool.

56. In a moving picture camera, the combination with a carriage, and means for imparting intermittent movement thereto, of means for engaging a film spool therewith, a take-up drum for film on said carriage, reciprocable film engaging means on said carriage adapted, when moved in one direction, to unwind a given length of film from said spool, means whereby said reciprocable means are released from engagement with said film when moved in the other direction, and gearing between said film engaging means and the carriage actuating means.

57. In a moving picture camera, the combination with a carriage, and means for imparting intermittent movement thereto, of means for engaging a film spool therewith, a take-up drum for film on said carriage, reciprocable film engaging means on said carriage adapted, when moved in one direction, to unwind a given length of film from said spool, means whereby said reciprocal means are released from engagement with said film when moved in the other direction, gearing between said film engaging means and the carriage actuating means and means effecting actuating engagement between said film engaging means and said take-up drum as the former moves in the direction to unwind film from said spool.

58. In a moving picture camera, the combination with a carriage, and means for imparting intermittent movement thereto, of film feeding means comprising a spool containing the film roll, a take-up drum, means disposed between said parts for engaging the film for unwinding the same from said drum, and gearing between said last-named means and the carriage actuating means.

59. In a moving picture camera, the combination with a carriage, and means for imparting intermittent movement thereto, of film feeding means comprising a spool containing the film roll, a take-up drum, reciprocal film gripping means disposed between said parts, mechanism for engaging and releasing the film as said means move in respectively opposite directions, and gearing between said gripping means and the carriage actuating means.

60. In a device of the kind specified, the combination with a reciprocably intermittently movable carriage, a fixed lens, a shutter therefor, and means on said carriage adapted to contain film; of mechanism adapted to engage said film to impart movement thereto in a direction transverse to the direction of travel of said carriage and at intervals following the arrival of said carriage at the respective limits of its movement; and actuating means common to said carriage, said shutter and said film engaging means.

61. In a device of the kind specified, the combination with a lens and a movable shutter therefor, of a film-carriage reciprocally movable with respect to the said lens, film-moving devices mounted upon the said film-carriage; and a single actuating member common to the said shutter, film-moving devices and film-carriage; the said member adapted to actuate the shutter, film-moving devices and film-carriage at different successive intervals to successively expose different film areas.

In testimony whereof we have signed our names in presence of two subscribing witnesses.

DAVID JAMES.
WILLIAM A. PETERS.

Witnesses:
RUDOLPH WM. LOTZ,
A. W. NEWCOMB.